United States Patent [19]

Kopecky

[11] Patent Number: 4,565,141
[45] Date of Patent: Jan. 21, 1986

[54] SEEDING APPARATUS WITH FERTILIZER APPLICATOR

[75] Inventor: Ivyl D. Kopecky, Ypsilanti, N. Dak.

[73] Assignee: Haybuster Manufacturing, Inc., Jamestown, N. Dak.

[21] Appl. No.: 563,198

[22] Filed: Dec. 19, 1983

[51] Int. Cl.$^4$ .......................... A01C 23/02; A01C 5/00
[52] U.S. Cl. .......................................... 111/7; 111/73; 111/86; 239/390
[58] Field of Search ...................... 111/6, 7, 34, 52, 73, 111/80, 85, 86; 193/2 R, 9; 239/390, 391, 397, 442

[56] References Cited

U.S. PATENT DOCUMENTS

| | | | |
|---|---|---|---|
| 909,991 | 1/1909 | Cole | 111/86 |
| 1,686,003 | 10/1928 | Hottinger | 239/390 |
| 1,899,931 | 3/1933 | Benjamin et al. | 111/34 |
| 2,048,441 | 7/1936 | Feltman | 111/59 |
| 2,159,652 | 5/1939 | Brunner | 111/86 |
| 2,713,836 | 7/1955 | Ajero | 111/80 |
| 2,849,969 | 9/1958 | Taylor | 111/7 |
| 2,889,788 | 6/1959 | Van Dorn | 111/80 |
| 2,924,189 | 2/1960 | McLeod | 111/80 |
| 2,928,533 | 3/1960 | Loucony | 239/391 |
| 3,122,111 | 2/1964 | Taylor, Sr. | 111/80 |
| 3,296,985 | 1/1967 | Shelton | 111/7 |
| 3,394,667 | 7/1968 | White | 111/6 |
| 3,399,638 | 9/1968 | Waldrum et al. | 111/6 |
| 3,797,418 | 3/1974 | Bridger, Jr. | 111/73 |
| 3,854,429 | 12/1974 | Blair | 111/86 |
| 4,278,036 | 7/1981 | Buchele | 111/73 |
| 4,417,530 | 11/1983 | Kopecky | 111/73 |

FOREIGN PATENT DOCUMENTS

| | | | |
|---|---|---|---|
| 2121661 | 1/1984 | United Kingdom | 111/86 |
| 257186 | 4/1970 | U.S.S.R. | 111/73 |

Primary Examiner—James R. Feyrer
Attorney, Agent, or Firm—Kinney & Lange

[57] ABSTRACT

A shank is used for seeding apparatus and has two passageways for permitting metered seed, and metered fertilizer to be placed into the ground from the same shank. A covering sealer shoe or plate for covering the fertilizer prior to the time that seed is deposited is provided to insure that the seed will be separated from the fertilizer by soil. The shank further includes a kit of attachments to permit easily changing the type of fertilizer applied from liquid to granular fertilizer, and also for changing the location of the depositing of the fertilizer. A further conversion includes the ability to deposit seed and granular fertilizer in one path or furrow, and apply a deep band of liquid fertilizer at the same time below the seed and granular fertilizer.

9 Claims, 11 Drawing Figures

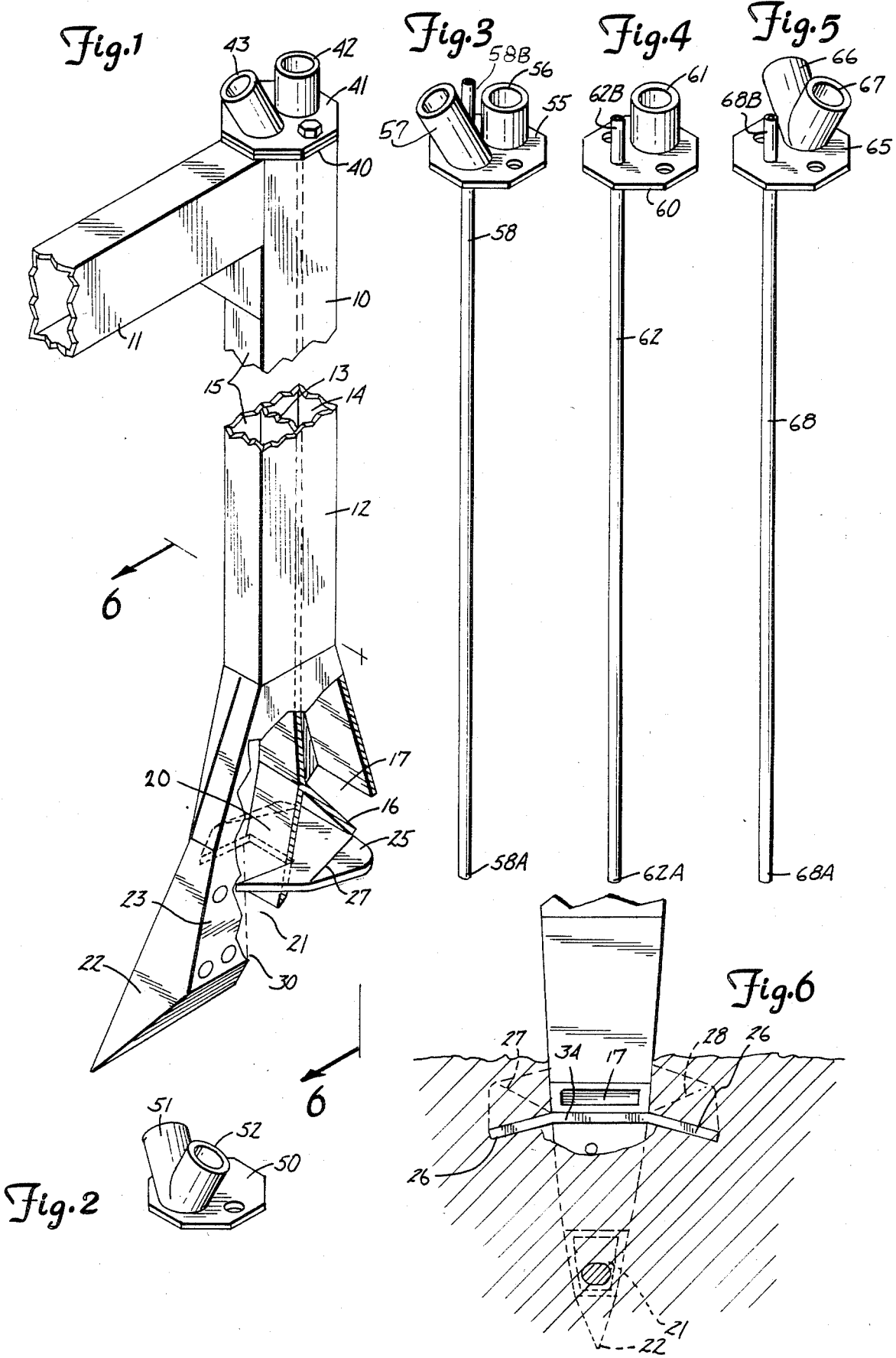

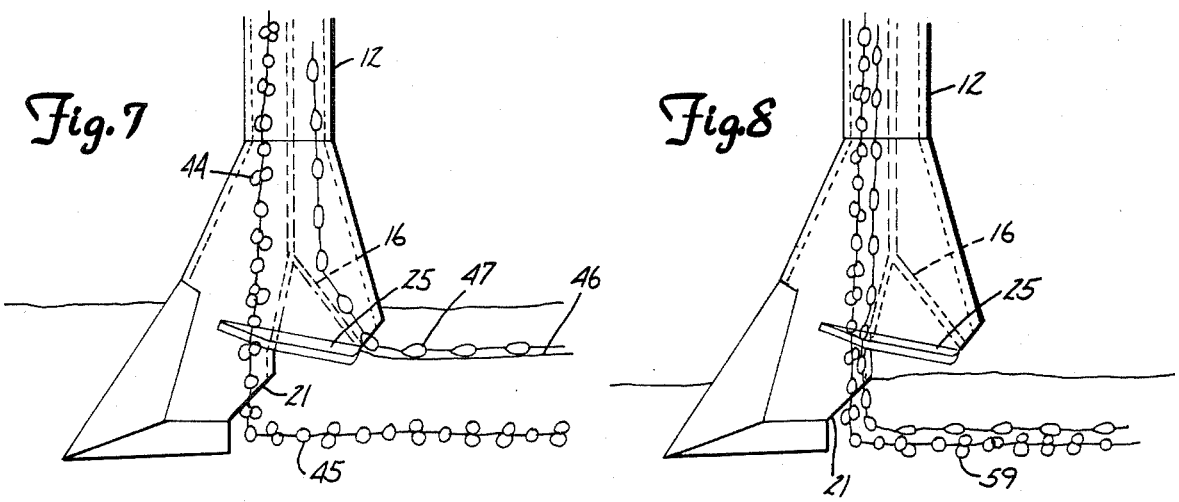
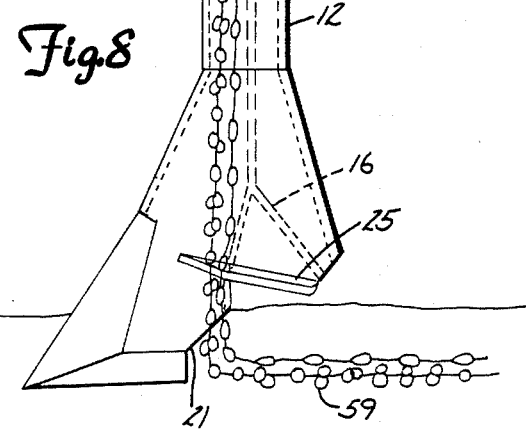
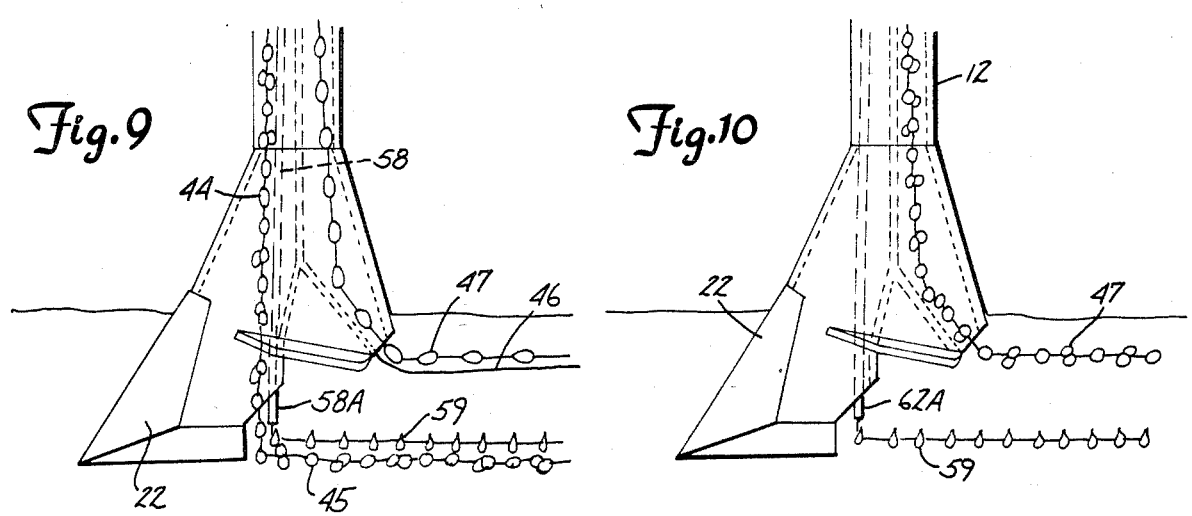
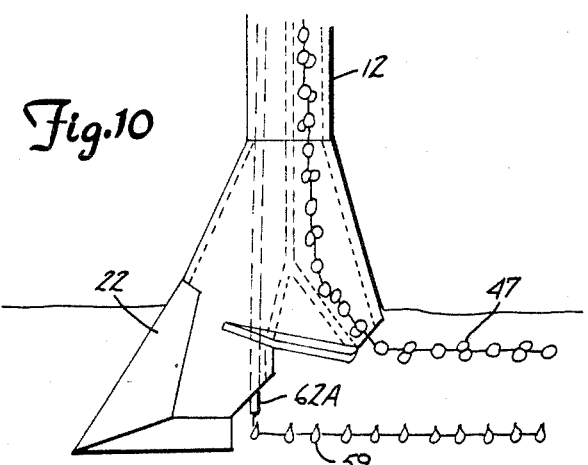
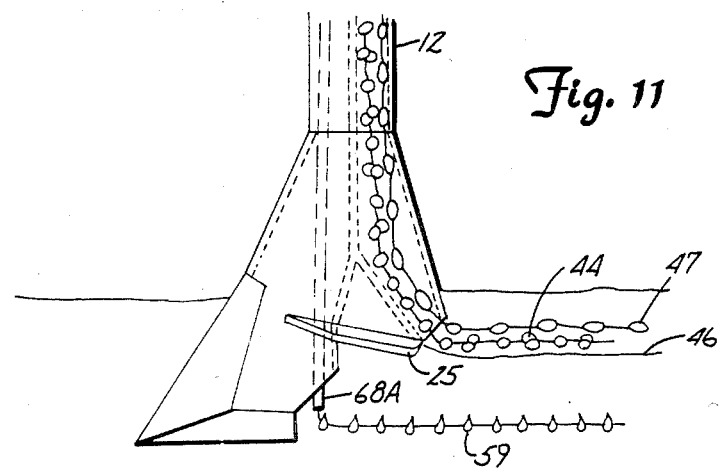

SEEDING APPARATUS WITH FERTILIZER APPLICATOR

BACKGROUND OF THE INVENTION

1. Field of the Invention

The present invention relates to seeding apparatus that permits the application of fertilizer and seeds simultaneously, and is convertible for different combinations of seed, granular fertilizer, and liquid fertilizer application.

2. Description of the Prior Art

Seed and fertilizer applicators are widely used at the present time. It has also been recognized that furrow opener shanks that have two vertical passageways can be utilized for applying seed and/or fertilizer in a furrow. For example, U.S. Pat. No. 4,417,530 shows a planting apparatus having a shank that deposits seed through two different passageways in the shank, and at two different depths. The prior art also shows devices such as that in U.S. Pat. No. 2,924,189 for planting at two different depths. U.S. Pat. No. 909,991 shows a grain drill shoe that has two passageways near the furrow opener, but does not have two individual fore and aft extending passageways for depositing materials.

U.S. Pat. No. 2,889,788 shows an opener that has two separate tubes behind it for depositing grain, one tube trailing the other, and discharging at different levels. Another early type planter that has two seperate tubes depositing material at different levels in the same furrow is U.S. Pat. No. 2,048,411.

U.S. Pat. No. 3,122,111 shows an implement for sod seeding that has two hoppers depositing two different types of materials into a vertical shank, and it includes a type of a covering plate trailing the first tube for pulverizing and packing the soil in the furrow, and then depositing seed on top of this pulverized soil. However, the particular shoe or blade has an opening in the rear which is shaped to permit a central portion to be built up in a type of a mound. The shoe is not used for packing a central bed in the opening into which the fertilizer is deposited. Arcuate blades are also employed in the prior art device making it somewhat difficult to manufacture, and tending to increase the power required to pull it through the ground. Also, because of the curved shape and downwardly extending rear tips it appears that the device shown in U.S. Pat. No. 3,122,111 would tend to plug as it moves through the ground.

SUMMARY OF THE INVENTION

The present invention relates to a shank for opening furrows for placing seeds and/or fertilizer into the ground. It is simply constructed, and has means for not only covering deeply banded fertilizer that may be placed into the ground with this shank, but for providing a very smooth, packed seed bed for the seed at different depth from the fertilizer. The shank also has means for converting it for multiple uses by having a removable and replaceable attachment plate at the top that permits various combinations of application of fertilizer, (both dry and liquid) and seed.

In particular, however, the plate that is used for covering the deeper fertilizer layer provides a very firm, smooth and even seed bed on which seed is deposited by the same shank. After the seed is deposited, the furrow is covered in any conventional manner. The fertilizer is separated from the seed by a layer of dirt, and the seed bed is firm, which is desirable for good germination.

The draft for pulling the shanks is minimized. The convertibility of the unit for multiple uses, through the use of simple changeable parts, increases the utility of the device for several different tasks.

BRIEF DESCRIPTION OF THE DRAWINGS

FIG. 1 is a perspective view of a shank assembly used for the present invention;

FIGS. 2 through 5 are views of modified cover plates that are used with the shank assembly of FIG. 1 for different combinations of application of materials;

FIG. 6 is a sectional view of the lower portion of the shank assembly of FIG. 1 showing a sealer plate in use; and FIGS. 7, 8, 9, 10 and 11 are side elevational views of the lower portion of the shank of FIG. 1 showing the application of materials with the cover plates of FIGS. 1-5, respectively.

DETAILED DESCRIPTION OF THE PREFERRED EMBODIMENTS

A drill shank indicated generally at 10 made according to the present invention is mounted onto a frame member 11 which is shown only schematically. The shank can be mounted in any desired way, and used with any desired seed and fertilizer supply tank and metering attachment. For example, in U.S. Pat. No. 4,417,530, mounting of shanks of this general type are shown. Thus, the particular mounting is not part of the present invention.

The shank 10 includes an upright tubular member 12 which has a rectangular cross section as shown, and which has an interior upright dividing wall 13 that divides the interior compartment into a first passageway 14 and a second passageway 15. These passageways extend from the upper end of the shank, where attachment plates are provided as will be described, to the lower end of the shank. The passageway 14, as shown, has a tapered bottom guide wall 16 at the lower end thereof that tapers rearwardly and downwardly, and the passageway terminates in a lower opening 17 through which materials from the passageway 14 may be discharged.

Passageway 15 has a forwardly and downwardly inclined rear wall 20 adjacent its lower edge, and a discharge opening 21 from passageway 15 is formed ahead of the opening 16, and at a lower level (deeper) than the opening 16. The discharge opening 21 is immediately to the rear of a furrow opening point 22 that is mounted between side walls 23. Walls 23 form the sides of the shank and are attached to the edges of the wall 13, bottom wall 16, and wall 20. The upper ends of walls 23 are joined to the side walls of upright tube 12. The furrow opening point 22 is a solid-point member and acts like a chisel point to open a furrow in a desired configuration.

A sealer-seed bed packing plate indicated at 25 is mounted at the lower end of the shank, and as shown has side wing members 26 which are bent downwardly about generally horizontal bend lines indicated at 27 and 28. A recess is formed in the forward end of the plate 25 so that the side portions 30 of the recess go to the outside of the plates 23. The recess is to fit around the passageway 15, which extends down to lower opening 21, below the sealer plate 25.

The wings 26 of plate 25 as shown extend laterally outwardly beyond the side of the side walls 23 of the shank. The bend lines 27 and 28 taper toward each other in rearwardly direction to form a planar or flat middle section 34 which therefore tapers in width. The middle section is wider at the front than at the rear. The shoe or plate 25 terminates at the lower edge of the tapered guide wall 16, so that the sealer plate is positioned above the opening 21, as shown in FIGS. 7–11, and the main part of the plate 25 is to the rear of this opening.

The sealer shoe or plate 25 acts as a pusher for dirt, and as can be seen extends laterally outward and beyond the chisel point 22 and beyond the width of the side walls 23. Thus it is moving in soil on the outside of the furrow opened by the chisel point 22 and the shank.

The upper end of the shank tube 12 has a support rim 40 that is fixed to the tube, and surrounds the top of the shank and is open in the center. The support rim 40 in turn is made for mounting a plurality of different types of cover or inlet plates which may form a kit to permit changing the seeding-fertilizer application positions. Each of the cover plates is configured differently so that the kit will permit selection of a different combination application of granular or liquid fertilizer, alone or with seed planting.

For example, in FIG. 1 a cover plate indicated generally at 41 is fastened to support rim 40 in a desired manner, and has a first connection tube or nipple 42 that opens through the plate 41 into the passageway 14, and this connection tube 42 forms means for connection to a metered seed outlet of a drill box (not shown) so that seed can be dropped through the passageway 14. A second connection tube 43 is provided on the plate 41 and this connection tube 43 permits connection to a metered granular fertilizer outlet (not shown) so the granular fertilizer can be applied through the passageway 15, and out the opening 21.

Reference is made to FIG. 7, where the arrangement is illustrated schematically in relation to the lower end of the shank assembly 10. As can be seen, granular fertilizer indicated generally at 44 is dropping through the passageway 15, and out through the opening 21 into a lower level portion of the furrow, or near the bottom of the furrow, as indicated at 45. The sealer plate 25 is in position so that the wing members 26 are forcing dirt in from the sides to cover the fertilizer 44 at the lower part of the furrow 45. The plate 25 will form a substantially smooth seed bed shown generally in 46 on which seed indicated at 47 coming through the passageway 14 will drop as guided by the wall 16 and, out through the opening 17.

Suitable packing wheels or other furrow covering devices (not shown) used conventionally will then cover the furrow to adequately cover the seeds for germination.

The sealer shoe or plate 25 provides for a smooth firm seed bed that is formed by dirt packed in from the sides of the furrow to separate the seed from the fertilizer in the furrow, and to provide a smooth seed bed for good germination. The dirt packing feature is of importance, and the provision of the smooth firm bed, as provided by the wall 34 that terminates along the rear edge of the shoe or plate (without a notch that may permit loose dirt to build up under the seed) aides in germination, and keeps the seed and fertilizer separated. Fertilizer will be available as the plants germinate and the roots penetrate into the ground.

In a typical example, the fertilizer will be deposited four to five inches below the surface, while the seed will be deposited maybe two to three inches into the ground, with at least an inch separating the fertilizer and the seed in vertical depth.

In order to make the shank assembly 10 more versatile, a modified cover plate indicated generally at 50 is provided (see FIG. 2). Plate 50 has a pair of connection tubes or nipples 51 and 52 thereon, both of which align with the passageway 15. The tubes 51 and 52 are actually "Y" connected into the forward passageway 15, and are adapted to be connected to a source of seed, and a source of granular fertilizer. The two granular or particulate materials, namely the seed and fertilizer, are both brought into the passageway 15 and deposited out through the opening 21 below the sealer plate 25. As shown in FIG. 8, both the seed and fertilizer are deposited into a seed bed formed at the bottom of a furrow that is at a selected depth. When using this combination as shown in FIG. 8, the sealer plate 25 is riding above the surface of the ground. The use of plate 50 permits a farmer to mix the fertilizer and seed in the furrow, but at a shallow depth, where this is desired.

In FIG. 3, there is a further modified cover plate 55, that has a connection tube or nipple 56 for connection to a seed outlet of a grain drill, and which aligns with the passageway 14 so that seed from the metering device will be discharged out through the opening 17 above the sealer shoe or plate 25. A connection tube or nipple 57, is provided on the cover plate 55 and is connectible to a granular or inorganic fertilizer outlet so that inorganic fertilizer can be deposited through the passageway 15 at the forward end of the shank 12. Additionally, however, there is an elongated small diameter tube 58 that is fastened to the plate 55, and is of length to extend into and through the passageway 15. The lower end 58A of elongated tube 58 terminates at about the level of the opening 21 from passageway 15, substantially immediately behind the chisel point 22. Tube 58 has an upper end 58B extending above the cover plate 55, and this end 58B is connectible to a source of liquid fertilizer, so that the tube 58 will carry the liquid fertilizer (for example anhydrous ammonia) down to its outlet end 58A and deposit it in the furrow opened by chisel point or furrow opener 22. With the form of the invention shown in FIG. 3 and also shown in FIG. 9, the sealing shoe or plate 25 will cover the fertilizer, both granular and liquid, and form a seed bed for the seed above the fertilizer.

FIG. 9 shows this arrangement with the granular fertilizer shown at 44, the seed shown at 47, and the liquid fertilizer represented at 59. The liquid fertilizer is placed in the furrow at the depth indicated at 45, along with the granular fertilizer. The seed 47 is placed on seed bed 46, above shoe or plate 25 and above the fertilizer. With liquid fertilizer it is important that the furrow be sealed adequately around the liquid fertilizer to prevent escape by evaporation, and shoe or plate 25 does this sealing adequately.

A further modified form of the cover plate is shown in FIG. 4, and includes a plate 60, that has a connection tube 61 for seed, so that seed can pass through the passageway 14 when it is placed on a shank, and also includes an elongated tube 62 that has a connection end at 62B above the plate 60, and a discharge end 62A that corresponds to the end 58A. The tube 62 extends through opening 21 at the lower end of passageway 15 as shown in FIG. 10. In this way, seed, again indicated at 47, is deposited above the level of the sealer shoe or plate 25 on a firm seed bed, and the liquid fertilizer, which is represented at 59, is deposited at the lower level. The furrow is sealed by the sealer plate 25 as previously described to separate the fertilizer from the seed, and to insure that the liquid fertilizer will not escape, because the furrow will be sealed substantially immediately after the liquid fertilizer is deposited.

A further form of the invention is shown in FIGS. 5 and 11, it includes an attachment plate 65 that has a connection tube 66 for seed and a granular fertilizer inlet connection tube or nipple 67 formed as a "Y" in alignment with passageway 14 of the shank so that both inorganic, granular fertilizer and seed will both be dropped through the passageway 14, when receiving the material from a metered source. Additionally, the plate 65 supports an elongated tube 68 that has a discharge end 68A that passes through the opening 21, and is positioned below the sealer plate 25 immediately behind the opening point 22. A connection end 68B above the cover plate 65, which is adapted to be connected to the metered outlet of a liquid fertilizer tank. Thus, if desired, a deep band of liquid fertilizer can be applied below the sealer plate, which plate will immediately cover the furrow opening and seal in the fertilizer, and the granular fertilizer 44 and seed 47 can be deposited together in the upper portion on the firm seed bed 46 formed by the sealer shoe or plate 25.

Thus, the shank of the present invention provides a wide variety of options merely by having attachment plates to form a kit that provides for different connections, to alternatively connect liquid, dry or inorganic granular fertilizer, and seed sources to the shank passageways. In all of the instances except for where shallow application of both seed and fertilizer is desired as shown in FIGS. 2 and 8, the plate 25 will quickly seal material in the deep furrow and provide a very firm seed bed at proper depth for the seed.

Although the present invention has been described with reference to preferred embodiments, workers skilled in the art will recognize that changes may be made in form and detail without departing from the spirit and scope of the invention.

What is claimed is:

1. A planting apparatus comprising:
    a tubular shank member having a pair of passageways therethrough extending from an upper end to lower discharge ports in each of said passageways, the port from a first of said passageways opening at a lower level, when the shank is in working position than the port from the second of said passageways;
    a furrow opening point mounted on the lower end of said shank member and preceding the passageways in the normal direction of travel of said shank member when in a working position;
    the first passageway being immediately to the trailing side of said furrow opening point and its discharge port opening above the lower edge of the furrow opening point, and
    a sealer plate mounted on said shank member in position above the discharge port from the first of said passageways, to the rear of said furrow opening point and said first passageway, and below the discharge port of said second passageway, said sealer plate extending laterally outwardly on both sides of said shank member and tapering outwardly from the shank in rearward direction to be substantially wider at the rear than at the front to form rear wing members, the wing members being bent downwardly at the rear portions of the sealer plate along bend lines that extend from the outer edges of the sealer plate inwardly toward the shank in rearward direction so the wing members converge in rearward direction so that when the shank member is in working position the sealer plate is below the surface of the ground and the wing members pack dirt into a furrow opened by said furrow opening point prior to the passage along the furrow of the discharge port of said second passageway.

2. The apparatus specified in claim 1 wherein said sealer plate wing members have a substantially straight edge at the trailing edge thereof, and wherein said trailing edge is immediately ahead of and below the discharge port from the second passageway.

3. A shank for a planter comprising:
    an upright support housing;
    a furrow opening point mounted at the lower end of said housing, said housing being adapted to be mounted to hold the furrow opening point below the level of the ground to open a furrow, when in a working position;
    means for defining a pair of discharge passageways for material defined in said housing, a first of said passageways having a first discharge opening substantially directly behind the furrow opening point and adjacent to the lower portions of the furrow opening point, the second of said passageways having a second discharge opening positioned to the rear of and above the first discharge opening;
    a seed bed compaction plate member mounted on said housing above the first discharge opening from the first passageway, and at a level below the second discharge opening from the second passageway, said plate member being positioned to the rear of the first passageway and ahead of the second passageway with respect to the direction of travel, the compaction plate member sloping downwardly to pack the dirt into the lower portion of the furrow, and below the second discharge opening to provide a firm seed bed;
    and adaptor means for the top of said shank for effecting the connections opening to each of the passageways, said adaptor means comprising a removable, replaceable cover plate, said cover plate having means for coupling at least one passageway to a source of material to be deposited in a furrow, said cover plate having an elongated tube fixed thereto which extends within one of the passageways to a position below the level of the ground to permit carrying liquid fertilizer into the ground.

4. The apparatus specified in claim 3 wherein said plate member has a trailing edge that is substantially perpendicular to the direction of travel throughout the width of the plate member.

5. A shank for a planter comprising:
    an upright support housing;
    a furrow opening point mounted at the lower end of said housing, said housing being adapted to be mounted to hold the furrow opening point below the level of the ground to open a furrow, when in a working position;
    means for defining a pair of discharge passageways for material defined in said housing, a first of said passageways having a first discharge opening substantially directly behind the furrow opening point and adjacent to the lower portions of the furrow opening point, the second of said passageways having a second discharge opening positioned to the rear of and above the first discharge opening;

a seed bed compaction plate member mounted on said housing above the first discharge opening from the first passageway, and at a level below the second discharge opening from the second passageway, said plate member being positioned to the rear of the first passageway and ahead of the second passageway with respect to the direction of travel, the plate member sloping downwardly to pack the dirt into the lower portion of the furrow, and below the second discharge opening to provide a firm seed bed;

said housing comprising a tubular housing divided into a pair of generally upright passageways forming the first and second passageways; and support rim means surrounding the passageways at the upper end of said housing, said rim means being adapted to support a removable replaceable cover plate, said lower plate housing comprising a cover plate being removably connectable to said rim means, and connection means on said cover plate for attachment to at least two sources of different materials selectively permitting a desired material to be discharged into selected ones of said passageways.

6. The apparatus of claim 5 wherein said cover plate connection means includes an elongated tube mounted on the cover plate and having a connection end on an upper side of said cover plate when the cover plate is installed on said housing, and said elongated tube having a discharge end that opens through one passageway to a position below the ground level through one of said discharge openings, said elongated tube being adapted to carry liquid fertilizer to discharge liquid fertilizer below the level of the ground in the furrow formed by the furrow opening point.

7. The apparatus of claim 5 wherein said cover plate has an elongated tube for carrying liquid fertilizer mounted on the cover plate and of length to extend through a first of said passageways in the housing, and said cover plate connection means including a connection tube opening into a secoond of said passageways in the housing when the cover plate is attached to said rim means.

8. The apparatus of claim 5 wherein said cover plate has an elongated tube for carrying liquid fertilizer mounted on the cover plate and forming part of the connection means, said tube being of length to extend through one passageway in the housing and through the discharge opening of such one passageway to discharge below the level of the ground when the shank is in working position, and said connection means also including a pair of separate connection tubes mounted on the cover plate and opening to the second passageway in the housing when the cover plate is attached to said rim means.

9. The apparatus of claim 5 wherein said cover plate connection means comprises a pair of connection tubes opening to the same passageway in the housing, said cover plate blocking the opening to the other of the passageways when the cover plate is mounted on said rim means.

* * * * *